(12) United States Patent
Iseki

(10) Patent No.: US 8,708,505 B2
(45) Date of Patent: Apr. 29, 2014

(54) DOOR MIRROR AND ASSEMBLY METHOD THEREFOR

(75) Inventor: Kota Iseki, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 697 days.

(21) Appl. No.: 12/961,820

(22) Filed: Dec. 7, 2010

(65) Prior Publication Data

US 2011/0141590 A1      Jun. 16, 2011

(30) Foreign Application Priority Data

Dec. 11, 2009   (JP) ................................. 2009-281437

(51) Int. Cl.
*G02B 7/182* (2006.01)
*B60R 1/06* (2006.01)

(52) U.S. Cl.
USPC ............ 359/841; 359/872; 359/900; 248/479

(58) Field of Classification Search
USPC ............................. 359/841, 872, 900; 248/479
See application file for complete search history.

(56) References Cited

U.S. PATENT DOCUMENTS

| | | | | |
|---|---|---|---|---|
| 4,789,232 A | * | 12/1988 | Urbanek ........................ | 248/549 |
| 5,384,660 A | * | 1/1995 | Oishi ............................ | 359/841 |
| 5,432,641 A | | 7/1995 | Mochizuki | |
| 5,467,222 A | * | 11/1995 | Oishi ............................ | 359/841 |
| 6,132,050 A | | 10/2000 | Sakata et al. | |
| 6,220,716 B1 | * | 4/2001 | Asaka ........................... | 359/871 |
| 6,322,221 B1 | * | 11/2001 | van de Loo ................... | 359/841 |
| 7,448,762 B2 | * | 11/2008 | Su ................................. | 359/841 |
| 8,123,369 B2 | * | 2/2012 | Itoh et al. ..................... | 359/841 |
| 2008/0297927 A1 | | 12/2008 | Onuki | |

FOREIGN PATENT DOCUMENTS

| | | |
|---|---|---|
| JP | 7-315128 A | 12/1995 |
| JP | 8-34288 | 2/1996 |
| JP | 2008-296719 | 12/2008 |

OTHER PUBLICATIONS

U.S. Appl. No. 12/961,911 to Kota Iseki, filed Dec. 7, 2010.
U.S. Appl. No. 12/961,979 to Kota Iseki, filed Dec. 7, 2010.
Japan Office action, dated Jul. 2, 2013 along with an english translation thereof.

* cited by examiner

*Primary Examiner* — Ricky D Shafer
(74) *Attorney, Agent, or Firm* — Greenblum & Bernstein, P.L.C.

(57) ABSTRACT

The present invention provides a door mirror and assembly method therefor with improved assembly performance. A housing support member, housing, and base of a manually retractable door mirror are assembled using screws, a coil spring, and a plate. During assembly, the housing support member is supported in an upside-down position by a jig, and the housing and base are placed in sequence in an upside-down position on the housing support member from above. An electric drive mechanism, fitting, housing, and base of an electrically retractable door mirror are assembled using screws. During assembly, the electric drive mechanism is supported in an upside-down position by a jig, and the fitting, housing, and base are placed in sequence in an upside-down position on the electric drive mechanism from above.

8 Claims, 15 Drawing Sheets

DOOR MIRROR AND ASSEMBLY METHOD THEREFOR

The disclosure of Japanese Patent Application No. JP2009-281437 filed on Dec. 11, 2009 including the specification, drawings, claims and abstract is incorporated herein by reference in its entirety.

BACKGROUND OF THE INVENTION

1. Field of the Invention

The present invention relates to a vehicle door mirror and assembly method therefor with improved assembly performance.

2. Description of the Related Art

A conventional manually retractable vehicle door mirror (hereinafter referred to as a manually retractable door mirror) is described in Japanese Patent Laid-Open No. 7-315128. A conventional electrically retractable vehicle door mirror (hereinafter referred to as an electrically retractable door mirror) is described in Japanese Utility Model Laid-Open No. 6-27337. The manually retractable door mirror described in Japanese Patent Laid-Open No. 7-315128 is assembled as follows: a shaft is assembled onto a frame (housing support member), the assembled structure is wrenched into the housing through a front opening or basal opening of the housing, the frame is screwed onto the housing through the front opening of the housing, a basal part of the shaft exposed through the basal opening of the housing is placed on a mirror base, and the basal part of the shaft is screwed onto the mirror base from the underside of the mirror base. On the other hand, the electrically retractable door mirror described in Japanese Utility Model Laid-Open No. 6-27337 is assembled as follows: an electric drive mechanism including a shaft, a motor, gears, and clutch is assembled onto a frame, the assembled structure is wrenched into the housing through a front opening or basal opening of the housing, the frame is screwed onto the housing through the front opening of the housing, a basal part of the shaft exposed through the basal opening of the housing is placed on a mirror base, and the basal part of the shaft is screwed onto the mirror base from the underside of the mirror base.

The conventional manually/electrically retractable door mirrors require assembly operations to be performed from various directions. Consequently, the assembly operations are complicated and difficult to automate.

SUMMARY OF THE INVENTION

The present invention has been made in view of the above points and has an object to provide a vehicle door mirror and assembly method therefor with improved assembly performance.

The present invention provides a manually retractable door mirror comprising: a housing support member provided with a shaft formed protruding downward and a screw hole opening downward around the shaft; a housing provided with a housing support member placement space in which the housing support member can be placed by being inserted from above, a lower opening which allows the shaft to be exposed downward with the housing support member placed in the housing support member placement space, and a housing support member fastening screw through-hole formed around the lower opening; a housing support member fastening screw which fastens the housing support member to the housing by being passed through the housing support member fastening screw through-hole from an underside of the housing and screwed into the screw hole in the housing support member; a base provided with a shaft passage hole into which the shaft is rotatably inserted, where the base is intended to be attached to an outer side of a car body and the shaft is exposed through the lower opening of the housing; and a spring member fitted, in a compressed state, over the shaft protruding from the shaft passage hole on the reverse side of the base. Since the housing support member, housing, and base are assembled from a single direction using the screw and spring member, the present invention enables ease of assembly and allows assembly operations to be automated.

The housing support member placement space may have a depression which, being open upward, houses and supports at least a lower part of the housing support member. This makes it easier to place the housing support member in the housing support member placement space. In the manually retractable door mirror according to the present invention, the housing support member may include an annular wall formed coaxially with the shaft by protruding downward at a location outwardly away from the shaft and the base may include an annular wall housing groove which is open upward to rotatably house the annular wall. The positions of the annular wall and the annular wall housing groove may be exchanged, placing the annular wall on the side of the base, and the annular wall housing groove on the side of the housing support member.

The present invention provides an assembly method for the manually retractable door mirror according to the present invention, comprising: a step of supporting the housing support member by receiving the housing support member in an upside-down position from below by a jig; a step of putting, from above, the housing in an upside-down position on the housing support member supported by the jig and placing the housing support member in the housing support member placement space; a step of coupling the housing and the housing support member to each other by passing the housing support member fastening screw through the housing support member fastening screw through-hole in the housing from above and screwing the housing support member fastening screw into the screw hole in the housing support member; a step of inserting the shaft into the shaft passage hole with the base being in an upside-down position, the shaft protruding upward from the lower opening of the housing; and a step of fitting the spring member, in a compressed state, over the shaft protruding from the shaft passage hole. Since the housing support member, housing, and base are assembled from a single direction using the screw and spring member, the present invention enables ease of assembly and allows assembly operations to be automated.

The present invention provides an electrically retractable door mirror comprising: an electric drive mechanism which includes a shaft, a motor, a gear, and a clutch housed and placed in an enclosure (casing), transmits a driving force from the motor to the shaft through the gear when the motor is operated, and thereby rotates the shaft relative to the enclosure around an axis of the shaft, where a screw hole is formed opening on an underside of the enclosure, an undersurface of the shaft is exposed outside the enclosure, and a screw hole is formed in the undersurface of the shaft; a housing provided with an electric drive mechanism placement space which allows the electric drive mechanism to be placed by being inserted from above, a lower opening which allows the undersurface of the shaft to be exposed downward with the electric drive mechanism placed in the electric drive mechanism placement space, and an electric drive mechanism fastening screw through-hole formed around the lower opening; an electric drive mechanism fastening screw which fastens the electric drive mechanism to the housing by being passed through the electric drive mechanism fastening screw through-hole from an underside of the housing and screwed into the screw hole in the enclosure of the electric drive mechanism; a base provided with an upright shaft fastening surface on which the undersurface of the shaft to be exposed through the lower opening of the housing is mounted and in which an upright shaft fastening screw through-hole is formed, where the base is intended to be attached to an outer side of a car body; and an upright shaft fastening screw which fastens the shaft upright to the upright shaft fastening surface and thereby rotatably supports the housing around the axis of the shaft by being passed through the upright shaft fastening screw through-hole from an underside of the base and screwed into the screw hole in the undersurface of the shaft. Since the electric drive mechanism, housing, and base are assembled from a single direction using the screw, the present invention enables ease of assembly and allows assembly operations to be automated.

The electric drive mechanism placement space may have a depression which, being open upward, houses and supports at least a lower part of the electric drive mechanism. This makes it easier to position the electric drive mechanism in the electric drive mechanism placement space. The depression can house and support the electric drive mechanism with an upper part of the electric drive mechanism protruding upward from the depression. This allows an assembly operation to be carried out with the upper part of the electric drive mechanism held by a jig. The electrically retractable door mirror according to the present invention can be configured such that the electric drive mechanism will be placed directly in the electric drive mechanism placement space. Alternatively, the electric drive mechanism may be held by a fitting and placed in the electric drive mechanism placement space together with the fitting.

The present invention provides an assembly method for the electrically retractable door mirror according to the present invention, comprising: a step of supporting the electric drive mechanism by receiving the electric drive mechanism in an upside-down position from below by a jig; a step of putting, from above, the housing in an upside-down position on the electric drive mechanism supported by the jig and placing the electric drive mechanism in the electric drive mechanism placement space; a step of coupling the housing and the electric drive mechanism to each other by passing the electric drive mechanism fastening screw through the electric drive mechanism fastening screw through-hole in the housing from above and screwing the electric drive mechanism fastening screw into the screw hole in the enclosure; a step of causing the undersurface of the shaft to face the upright shaft fastening surface by putting the base in an upside-down position over the undersurface of the shaft exposed upward from the lower opening of the housing; and a step of passing the upright shaft fastening screw through the upright shaft fastening screw through-hole of the base from above, screwing the upright shaft fastening screw into the screw hole in the undersurface of the shaft, and thereby fastening the shaft upright to the upright shaft fastening surface of the base. Since the electric drive mechanism, housing, and base are assembled from a single direction using the screw, the present invention enables ease of assembly and allows assembly operations to be automated.

DETAILED DESCRIPTION OF THE PREFERRED EMBODIMENTS

First Embodiment of Manually Retractable Door Mirror

Figure 1:
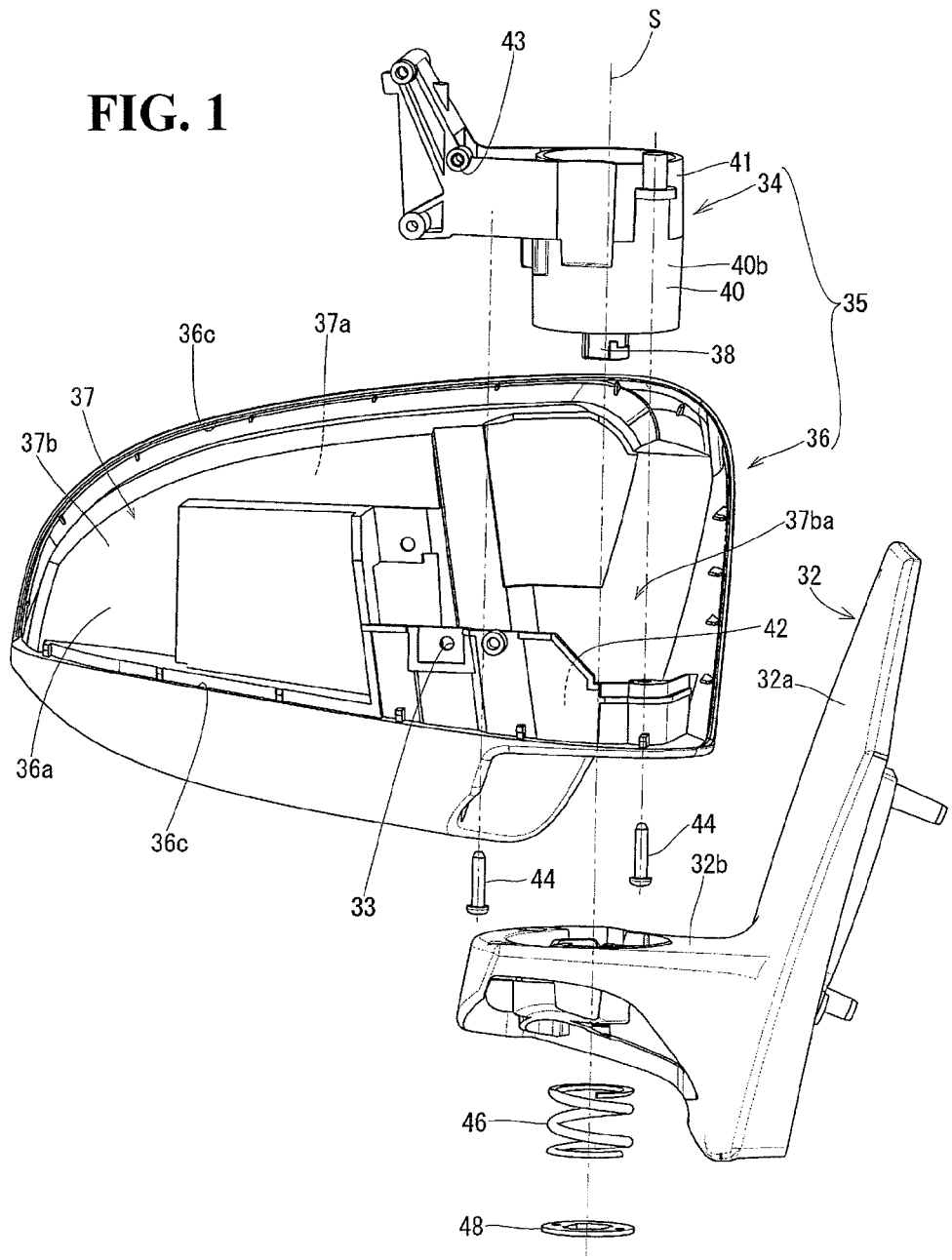
FIG. 1 is an exploded perspective view showing principal part of a first embodiment of a manually retractable door mirror according to the present invention.
Figure 7:
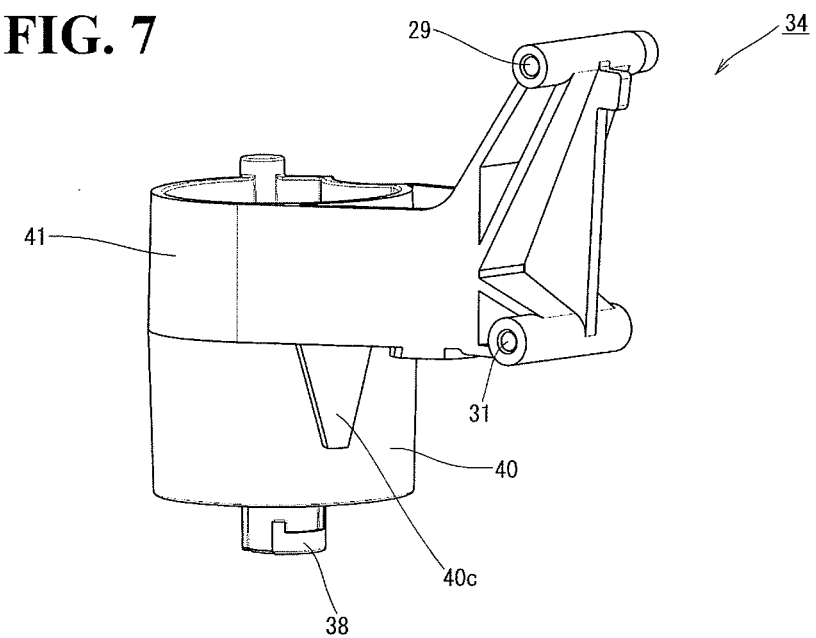
FIG. 7 is a perspective view of the housing support member 34 in FIG. 1 as viewed from the side on which a stopper 40c is formed.

A first embodiment of a manually retractable door mirror according to the present invention will be described. FIG. 1 is an exploded view showing a configuration of a manually retractable vehicle door mirror according to the present embodiment. This is a right door mirror as viewed from the rear. A housing cover mounted on the rear side of a housing (mirror body) 36, a mirror angle adjustment actuator fixedly placed in a front space 37*a* (FIG. 4) of the housing 36, a mirror plate fixedly supported by the mirror angle adjustment actuator in the state where the mirror angle can be adjusted, and so on are not shown in FIG. 1. The door mirror includes a base 32 attached to an outer side of a car body, a housing support member 34 (frame) bearing-supported on the base 32 in such a way as to be able to rotate around a rotation axis S, and a housing 36 fixedly supported by the housing support member 34. The housing 36 houses the housing support member 34 in a depression 42 in an inner space 37, places the housing support member 34 in a housing support member placement space 37*ba*, and is fixedly supported by the housing support member 34 with screws 44. In this way, the housing support member 34 and housing 36 are integrated by being fixedly coupled to each other, to form a mirror rotating member 35. When the housing support member 34 and housing 36 are integrated, a shaft 38 of the housing support member 34 and annular wall 40 on an outer circumferential side of the shaft 38 protrude downward from an undersurface of the housing 36. The shaft 38 and annular wall 40 are inserted, respectively, into a shaft passage hole 56 and annular wall housing groove 58 (FIGS. 8 and 9) formed in a rotation support section 32*b* of the base 32, a coil spring 46 is fitted, in a shortened (compressed) state, over the shaft 38 from under the base 32, and a plate 48 is attached to a lower end of the shaft 38, thereby coupling the housing support member 34 and base 32 together. Consequently, the housing 36 can be moved among a retracted position (backward folded position), return position, and forward tilted position (forward folded position) by being rotated manually together with the housing support member 34 around the rotation axis S within an angular range permitted by a stopper 40*c* (FIG. 7).

Figure 3:
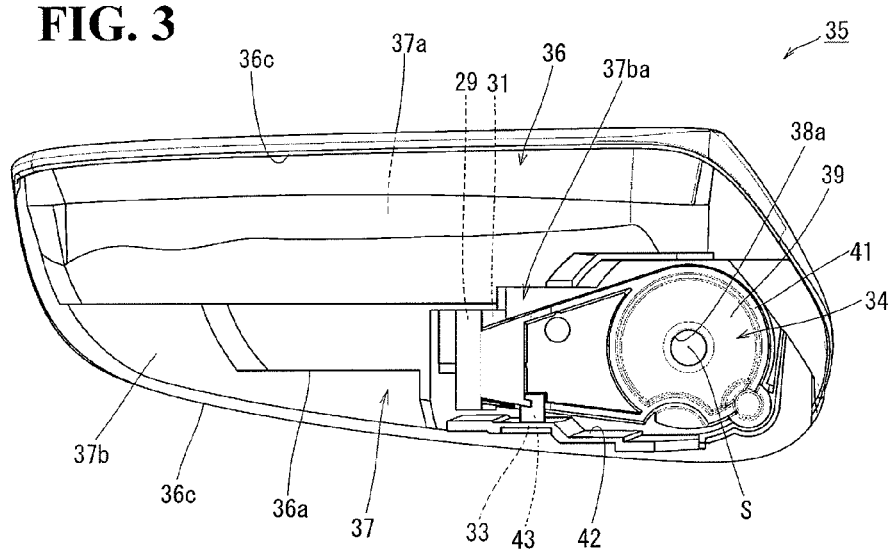
FIG. 3 is a plan view showing how a housing support member 34 is housed in a depression 42 in a housing 36 and placed in a housing support member placement space 37ba, in the manually retractable door mirror shown in FIG. 1.
Figure 4:
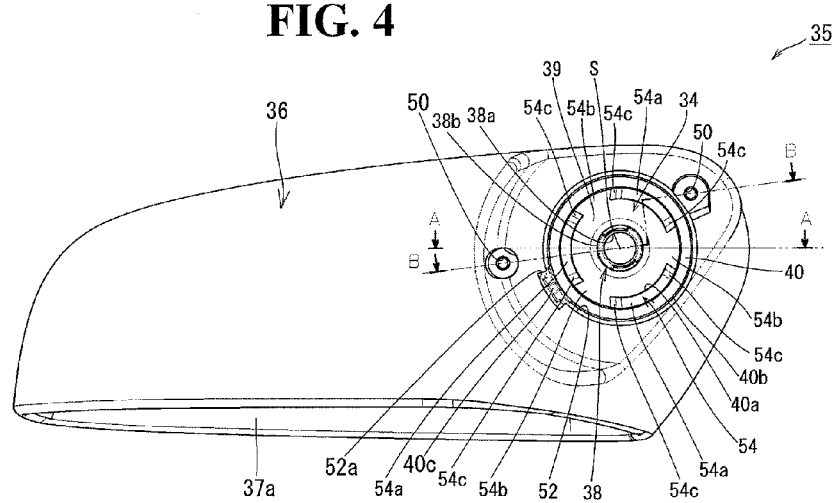
FIG. 4 is a bottom view of the assembled components shown in FIG. 3.
Figure 6:
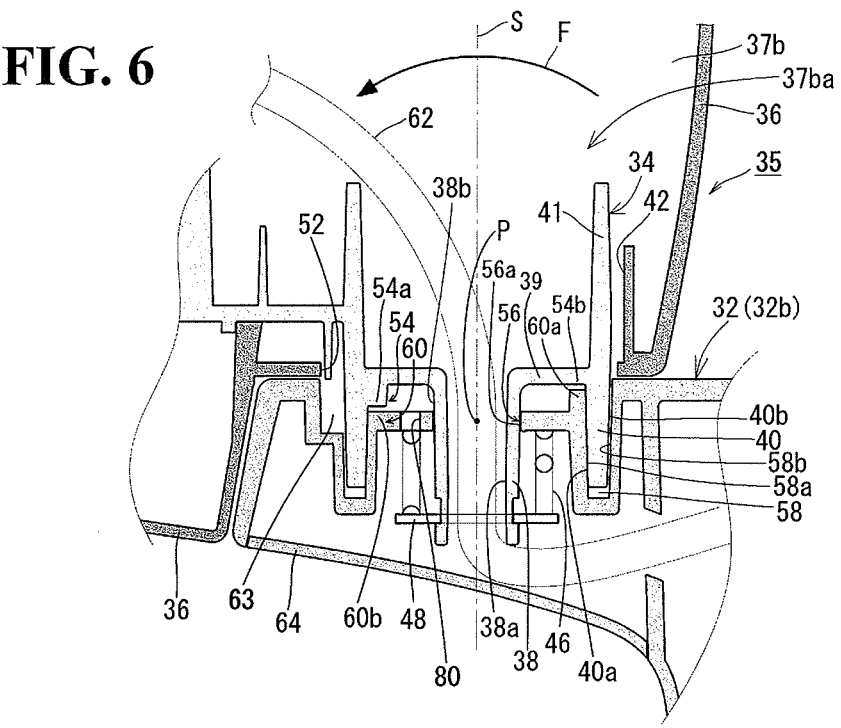
FIG. 6 is a partial sectional view (which corresponds to a cross section taken along line A-A in FIGS. 4 and 8) of a manually retractable door mirror in FIG. 1 cut along a plane passing through a rotation axis S when a housing 36 is at a return position.
Figure 12:
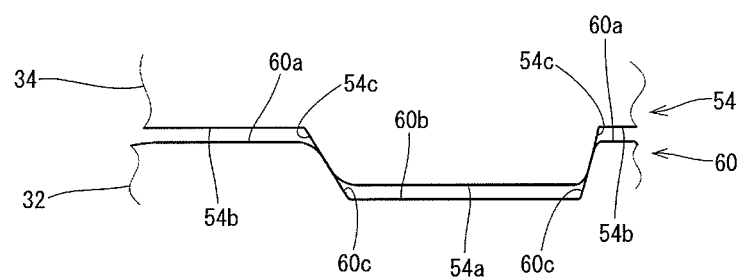
FIG. 12 is partially enlarged front view showing how a base-side portion 60 and mirror-rotating-member-side portion 54 of a clutch are meshed with each other when the housing 36 of the door mirror in FIG. 1 is at a return position.

The housing support member 34, housing 36, and base 32 in FIG. 1 will be described. The housing support member 34 is a one-piece molding of rigid plastics such as PA+GF (glass fiber filled polyamide) resin or a one-piece casting of metal such as aluminum. As shown in FIG. 1, the housing support member 34 includes the shaft 38 which rotates relative to the base 32 by being shaped as a hollow round bar and placed on the rotation axis S, and the annular wall 40 which is circular in shape, located outwardly away from the shaft 38, and formed coaxially with the shaft 38 by being radially spaced from the shaft 38. Since the shaft 38 is formed integrally with the housing support member 34, there is no need for a shaft as an independent part. This reduces the number of parts and thereby improves efficiency of assembly operations. The annular wall 40 becomes slightly thinner in plate thickness toward the bottom (FIG. 6). The annular wall 40 protrudes upward beyond a disk-shaped coupler 39 (FIGS. 3 and 6) joining the annular wall 40 and shaft 38 and forms an annular wall extension 41. The annular wall extension 41 serves to increase rigidity of the annular wall 40. As shown in FIG. 6, in a space surrounded by the annular wall 40, coupler 39, and shaft 38, a mirror-rotating-member-side portion 54 of a clutch is formed on a boundary between the coupler 39 and annular wall 40 (just inside the annular wall 40), being placed coaxially with the shaft 38 and annular wall 40. As shown in FIG. 4, the mirror-rotating-member-side portion 54 of the clutch includes a ridge 54*a* and trough 54*b* repeated three times at equal intervals in a circumferential direction. Each boundary 54*c* between ridge 54*a* and trough 54*b* is formed to be an inclined surface (FIG. 12). As shown in FIG. 7, in some circumferential area on an outer circumferential surface of the annular wall 40, the stopper 40*c* is formed, protruding radially outward. Being placed in a stopper traveling groove 63 at a location just on the outer circumferential side of the annular wall housing groove 58 of the base 32 in FIG. 8, the stopper 40*c* moves along the stopper traveling groove 63 as the housing support member 34 rotates and is restrained by abutting against opposite ends 63*a* and 63*b* of the stopper traveling groove 63, where the stopper traveling groove 63 is formed in some circumferential area around the rotation axis S. The stopper 40*c* is restrained by the end 63*a* at the forward folded position of the housing 36 and restrained by the end 63*b* at the retracted position (backward folded position) of the housing 36. Since the stopper 40*c* is formed on the outer circumferential surface of the annular wall 40, the stopper 40*c* can be supported more firmly than when the stopper 40*c* is coupled to the housing support member 34 by its base alone without the annular wall 40. This prevents the stopper 40*c* from being broken. Conversely, the stopper traveling groove 63 may be formed at a location just on the inner circumferential side of the annular wall housing groove 58 and the stopper 40*c* may be formed on an inner circumferential surface of the annular wall 40, protruding therefrom. As shown in FIG. 7, on the front side of the housing support member 34, screw holes 29 and 31 are formed to screw and support part of the mirror angle adjustment actuator.

Figure 2:
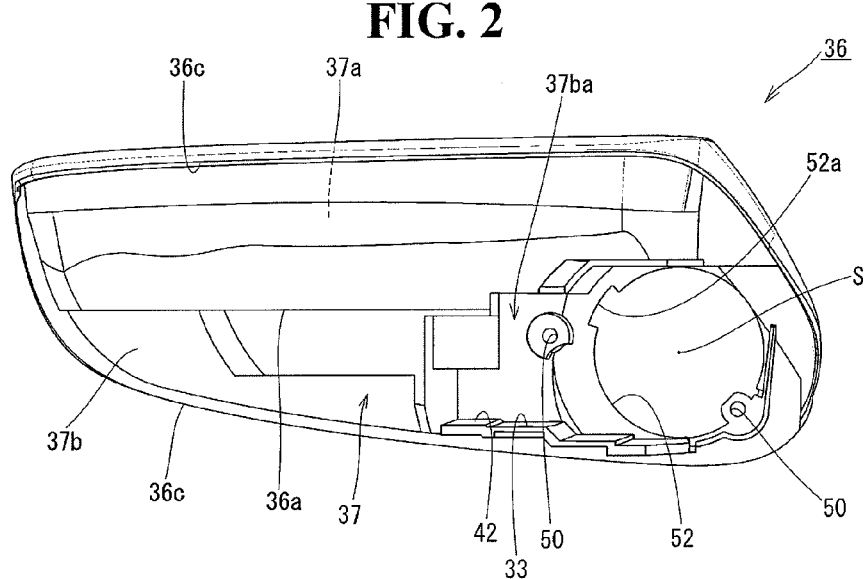
FIG. 2 is a plan view of a housing 36 alone of the manually retractable door mirror in FIG. 1.
Figure 19:
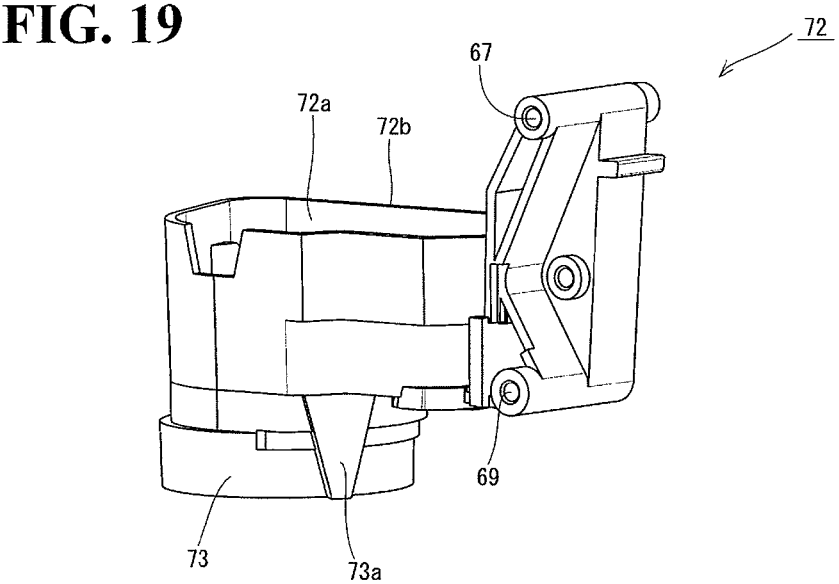
FIG. 19 is a perspective view of a fitting 72 in FIG. 18 as viewed from the side on which a stopper 73a is formed.

The housing 36 in FIG. 1 is a one-piece molding of plastics such as ABS lower in rigidity than the housing support member 34. As shown in FIG. 1, the inner space 37 of the housing 36 is generally partitioned by a partition plate 36*a* into the front space 37a and a rear space 37b. The mirror angle adjustment actuator (not shown) is housed in the front space 37a (FIG. 4) by being placed in front of the partition plate 36a. That is, part of the mirror angle adjustment actuator is secured with screws to screw holes (not shown) formed in a front face of the partition plate 36a while other part of the mirror angle adjustment actuator is secured with screws to the screw holes 29 and 31 (FIG. 7) in the front side of the housing support member 34. A mirror plate (not shown) is mounted on the mirror angle adjustment actuator. The housing support member placement space 37ba (in common with an electric drive mechanism placement space of an electrically retractable door mirror) (FIG. 1) is formed in the rear space 37b to allow the housing support member 34 to be placed by being inserted from above. The depression 42 (FIGS. 1, 2, 3 and 5) is formed in lower part of the housing support member placement space 37ba by opening upward. The housing support member 34 is housed in the depression 42. A screw through-hole 33 (FIG. 1) is formed in the rear side of the housing 36. A screw (not shown) is inserted into the screw through-hole 33 and screwed into a screw hole 43 (FIG. 1) formed in the rear side of the housing support member 34. Consequently, the housing 36 and housing support member 34 are fastened to each other from the rear side of the housing 36 as well. The rear space 37b of the housing 36 is closed by a housing cover (not shown) mounted thereon. A round hole 52 (FIG. 2) (a lower opening) is formed on the rotation axis S in the bottom of the housing 36 to allow the shaft 38 of the housing support member 34 and the annular wall 40 to protrude. A recess 52a (FIGS. 2, 4, 14 and 21) is formed in the round hole 52 to pass the stoppers 40c (FIG. 7) and 73a (FIG. 19).

Figure 8:
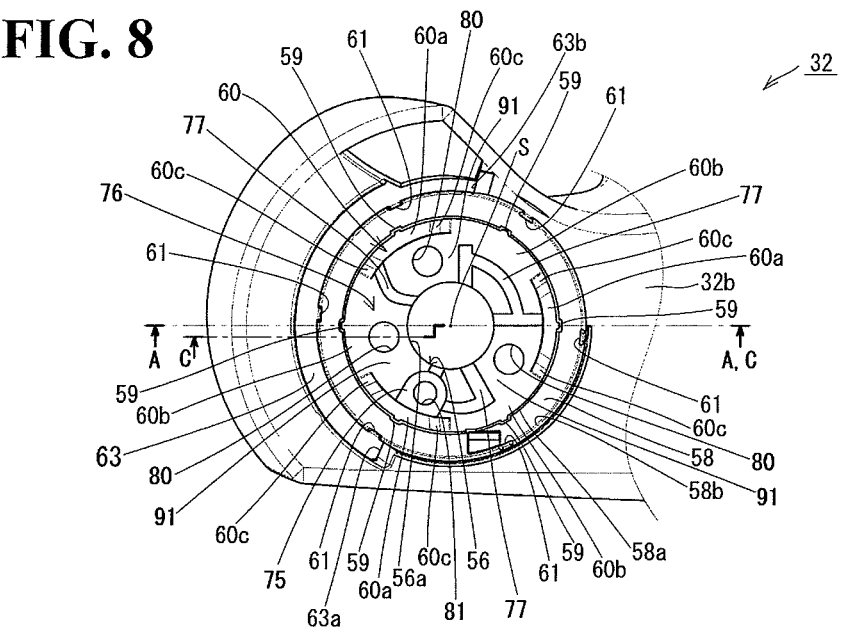
FIG. 8 is a plan view of a rotation support section 32b of a base 32 in FIG. 1.
Figure 9:
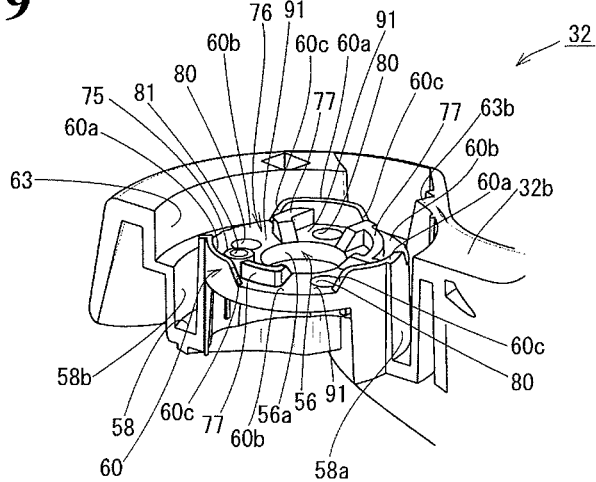
FIG. 9 is a partially cut-away perspective view of the rotation support section 32b of the base 32 in FIG. 1.

The base 32 (the common base for manually retractable and electrically retractable door mirrors) is a one-piece molding of rigid plastics such as PA+GF resin or a one-piece casting of metal such as aluminum. The base 32 includes a car body fixing section 32a fastened to the car body and the rotation support section 32b which protrudes laterally from a lower end of the car body fixing section 32a and provides bearing support to rotatably support the housing support member 34. FIG. 8 shows the rotation support section 32b of the base 32 as viewed from above. FIG. 9 is a partially cutaway perspective view of the rotation support section 32b. The rotation support section 32b includes the shaft passage hole 56 formed on the rotation axis S, the annular wall housing groove 58 formed on the outer circumferential side of the shaft passage hole 56, and the clutch's base-side portion 60 formed coaxially with the annular wall housing groove 58 and the shaft passage hole 56 just on the inner circumferential side of the annular wall housing groove 58. The shaft passage hole 56 is designed to be just large enough to pass the shaft 38 with slight clearance when the housing 36 is at the return position. On an inner wall surface 58a and outer wall surface 58b of the annular wall housing groove 58, to define abutting positions with respect to an inner wall surface 40a and outer wall surface 40b of the annular wall 40 (FIG. 6), six ribs 59 or 61 each are formed in protrusion at equal circumferential angles, extending in a direction parallel to the rotation axis S. The annular wall housing groove 58 and annular wall 40 have such an inside diameter and outside diameter, respectively, that the inner wall surface 58a (positions of the ribs 59) and inner wall surface 40a as well as the outer wall surface 58b (positions of the ribs 61) and outer wall surface 40b will abut each other without clearance when the housing 36 is at the return position. Groove width of the annular wall housing groove 58 decreases slightly toward the bottom (FIG. 6) to suit changes in the plate thickness of the annular wall 40. Depth of the annular wall housing groove 58 is designed to be large enough for the mirror-rotating-member-side portion 54 and base-side portion 60 of the clutch to always abut each other, within an angular range in which the housing support member 34 can rotate relative to the base 32. The base-side portion 60 of the clutch includes a ridge 60a and trough 60b repeated three times at equal intervals in a circumferential direction just on the inner circumferential side of the annular wall housing groove 58 (FIGS. 8 and 9). Each boundary 60c between ridge 60a and trough 60b is formed to be an inclined surface (FIGS. 9 and 12).

The manually retractable door mirror in FIG. 1 is assembled, for example, as follows.

Figure 13:
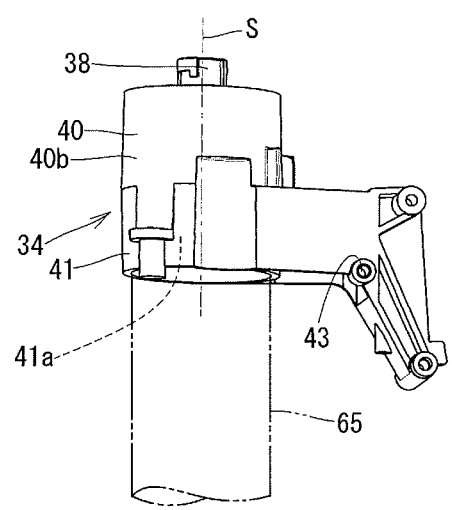
FIG. 13 is a perspective view showing how the housing support member 34 is received and supported from below in an upside-down position by a jig 65 during assembly of the manually retractable door mirror in FIG. 1 using an assembly method according to the present invention.

(1) As shown in FIG. 13, a jig 65 which supports the housing support member 34 is fastened upright on a foundation (not shown) such as a workbench, and the housing support member 34 is supported in an upside-down position by being put over the top of the jig 65. In the example of FIG. 13, the jig 65 is a rod-like member, which is fastened vertically upright on the foundation. Then, the top of the jig 65 is detachably housed without wobble in a depression 41a surrounded by the annular wall extension 41 of the housing support member 34, and consequently the housing support member 34 is held by the jig 65.

Figure 5:
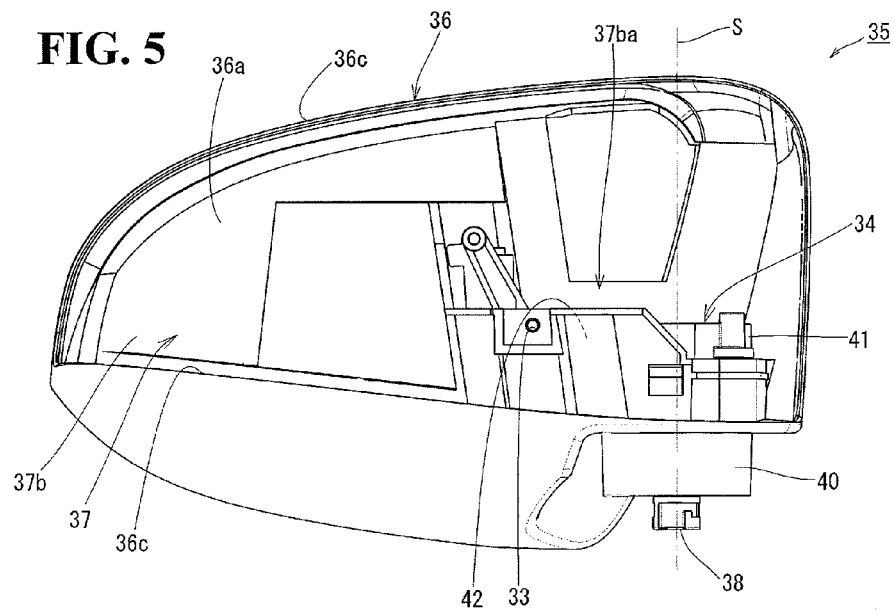
FIG. 5 is a rear view of the assembled components shown in FIG. 3.

(2) With the housing support member 34 turned upside down, the components in FIG. 1 are assembled one after another in an upside-down position onto the housing support member 34 from above. Specifically, first the housing 36 is turned upside down and brought close to the housing support member 34 from above, and the housing support member 34 is placed in the housing support member placement space 37ba by placing the housing support member 34 in the depression 42. Resulting state of the housing 36 and housing support member 34 is shown in FIGS. 3, 4 and 5 (in an upside-down position, however). Once the housing support member 34 is housed in the depression 42, since the housing 36 is supported by the housing support member 34, the housing 36 does not fall off the housing support member 34 even if not held by hand.

Figure 11:
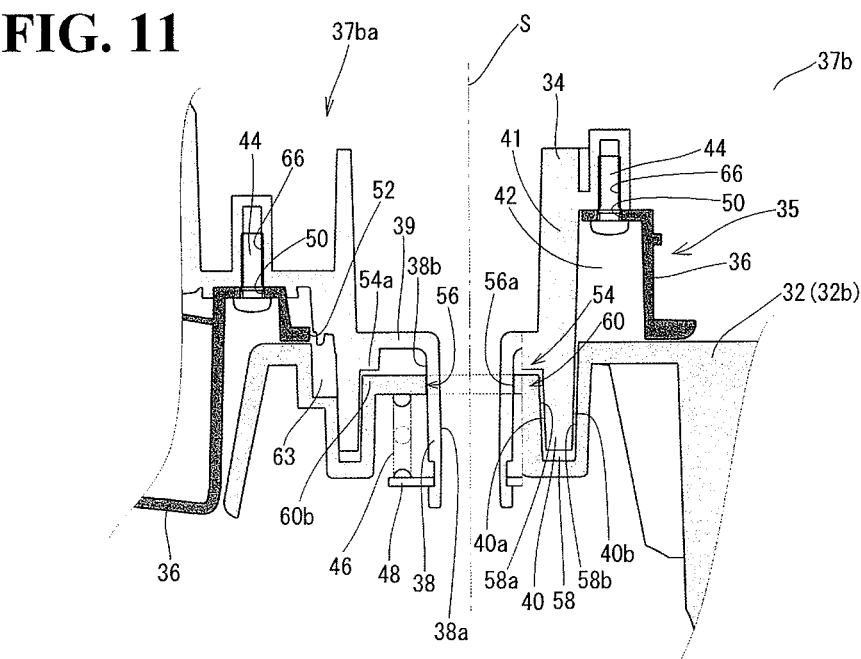
FIG. 11 is a partial sectional view (which corresponds to a cross section taken along line B-B in FIG. 4) of the housing support member 34 and housing 36 of the door mirror in FIG. 1, at a position where the components are fixedly coupled.

(3) Screws 44 (FIG. 1) are inserted, from above, through two screw through-holes 50 (FIG. 4) formed in the housing 36 and are screwed into screw holes in the housing support member 34 to fixedly couple the housing 36 and housing support member 34 to each other. FIG. 11 shows a cross section (which corresponds to a cross section taken along line B-B in FIG. 4) taken at the position where the housing support member 34 and housing 36 are fixedly coupled (in an upside-down position, however). The housing support member 34 and housing 36 are fixedly coupled to each other as the screws 44 are inserted through the screw through-holes 50 formed in the housing 36 and screwed into the screw holes 66 formed in the housing support member 34.

(4) The base 32 is turned upside down and brought close to the housing 36 from above, and then the shaft 38 and annular wall 40 protruding upward from the round hole 52 in the housing 36 are rotatably inserted, respectively, into the shaft passage hole 56 and annular wall housing groove 58 formed in the rotation support section 32b of the base 32. Consequently, since the base 32 is held on the housing support member 34 by the shaft 38 and annular wall 40, the base 32 does not fall off the housing support member 34 even if not held by hand.

(5) The coil spring 46 is fitted, from above, over the shaft 38 protruding upward through the base 32 and the plate 48 is mounted on an upper end of the shaft 38, thereby fitting the coil spring 46 around the shaft 38 in a compressed state.

Figure 10:
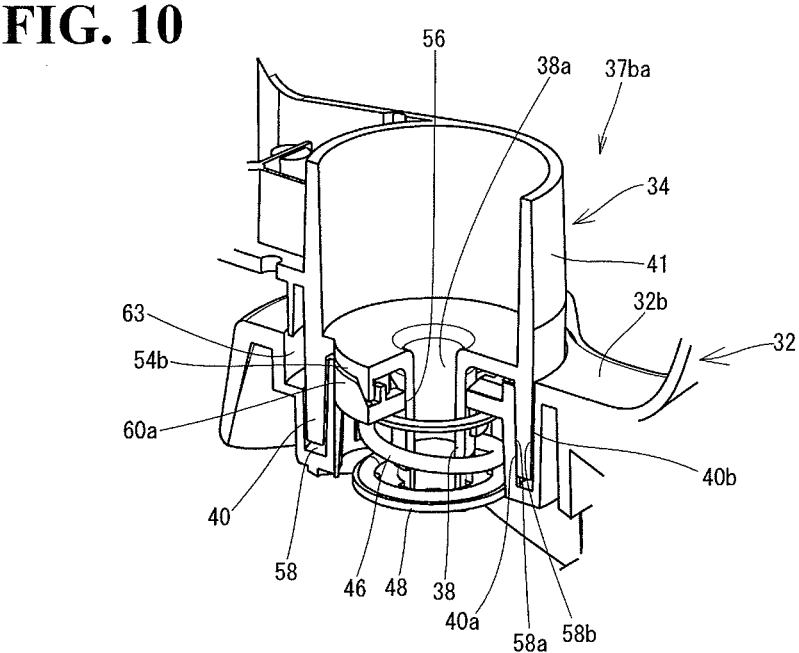
FIG. 10 is a partially cut-away perspective view of the manually retractable door mirror shown in FIG. 1.

Consequently, the base 32, housing support member 34, and housing 36 are put on a bearing supported state by being coupled to each other in such a way as to be able to rotate around the rotation axis S as shown in FIGS. 6, 10 and 11 (in an upside-down position, however).

(6) A screw (not shown) is inserted into the screw through-hole 33 (FIG. 1) in the rear side of the housing 36 and screwed into the screw hole 43 (FIG. 1) in the housing support member 34 to reinforce the coupling between the housing 36 and housing support member 34.

(7) The structure thus assembled is removed from the jig 65, and then the housing cover is attached to an opening (a region surrounded by edges 36*c* shown in FIGS. 1, 2, 3 and 5) in the rear side of the housing 36. Consequently, the housing support member 34 excluding the shaft 38 and annular wall 40 protruding from the round hole 52 in the housing 36, i.e., that part of the housing support member 34 which is above the coupler 39 (FIG. 6), has been housed in the inner space 37 of the housing 36.

(8) The mirror angle adjustment actuator is mounted in the front space 37*a* of the housing 36, and then the mirror plate is mounted on the mirror angle adjustment actuator.

Since the components can be assembled from above under the state where the housing support member 34 is supported by the jig 65 in Steps (1) to (5), the steps described above enable ease of assembly and make it easy to automate assembly.

FIG. 6 shows the door mirror in FIG. 1 assembled and cut along a plane passing through the rotation axis S when the housing 36 is at the return position (corresponding to a cross section taken along line A-A in FIGS. 4 and 8). A harness 62 is passed through a hollow part 38*a* of the shaft 38 to supply electric drive power to the mirror angle adjustment actuator and the like. A lower opening of the base 32 is closed by a lid 64. When the housing 36 is at the return position, an urging force of the coil spring 46 acts to push the base 32 and the housing support member 34 toward each other along the rotation axis S, bringing the ridges 60*a* and troughs 60*b* of the base-side portion 60 (FIGS. 8 and 9) of the clutch into mesh (state shown in FIG. 12) with the troughs 54*b* and ridges 54*a* of the mirror-rotating-member-side portion 54 (FIG. 4). Consequently, the housing support member 34 with the housing 36 mounted is held in standing position on the base 32. In so doing, the inner wall surface 40*a* and outer wall surface 40*b* of the annular wall 40 come into abutment with the ribs 59 and 61 on the inner wall surface 58*a* and outer wall surface 58*b* of the annular wall housing groove 58, holding the housing 36 at the return position without wobble. There is slight clearance between an outer circumferential surface 38*b* of the shaft 38 and inner circumferential surface 56*a* of the shaft passage hole 56.

When the housing 36 is at the return position, if a force is applied manually to the housing 36 in a direction around the rotation axis S against the urging force of the coil spring 46, the inclined surface 54*c* (FIG. 12) of the mirror-rotating-member-side portion 54 of the clutch slides upward along the inclined surface 60*c* of the base-side portion 60, causing the clutch to come out of mesh. As the inclined surface 54*c* slides upward, the housing support member 34 moves upward accordingly. Since the plate thickness of the annular wall 40 decreases slightly toward the bottom and the groove width of the annular wall housing groove 58 decreases slightly toward the bottom to suit changes in the plate thickness of the annular wall 40 (FIG. 6) as described above, when the housing support member 34 moves upward, the abutment of the inner wall surface 40*a* and outer wall surface 40*b* of the annular wall 40 with the ribs 59 and 61 on the inner wall surface 58*a* and outer wall surface 58*b* of the annular wall housing groove 58 is eased (clearance is created between the wall surfaces), allow-ing the housing 36 to rotate around the rotation axis S. Consequently, the housing 36 moves to the retracted position (backward folded position) or to the forward tilted position opposite the retracted position. When the housing 36 rotates, bearing support is provided by sliding of the inner wall surface 40*a* and outer wall surface 40*b* of the annular wall 40 along the inner wall surface 58*a* and outer wall surface 58*b* of the annular wall housing groove 58 and/or sliding of the outer circumferential surface 38*b* of the shaft 38 along the inner circumferential surface 56*a* of the shaft passage hole 56.

When the housing 36 is at the return position, if an unexpected force (e.g., a downward load) is applied to the housing 36, increasing a bending moment (a moment oriented in the direction indicated by arrow F, i.e., a moment around a center position P of the shaft passage hole 56 in FIG. 6) exerted on the housing support member 34, and thereby causing the housing support member 34 to tilt, the inner wall surface 40*a* and outer wall surface 40*b* of the annular wall 40 come into pressing abutment with the ribs 59 and 61 on the inner wall surface 58*a* and outer wall surface 58*b* of the annular wall housing groove 58 while the outer circumferential surface 38*b* of the shaft 38 comes into pressing abutment with the inner circumferential surface 56*a* of the shaft passage hole 56 due to tilting of the shaft 38, and consequently, the unexpected force is shared and borne by the three pairs of surfaces in pressing abutment. Therefore, the housing support member 34 provides high rigidity and high bearing capacity for external forces as a whole. Thus, even if the housing support member 34 is made of a one-piece molding of rigid plastics such as PA+GF resin instead of metal, it is possible to prevent the shaft 38 and annular wall 40 from being bent or broken. If each of the housing support member 34 and base 32 is made of a one-piece molding of rigid plastics such as PA+GF resin, the door mirror can be manufactured at low costs. According to the present embodiment, in particular, when the housing 36 is at the return position, since the inner wall surface 40*a* and outer wall surface 40*b* of the annular wall 40 abut the ribs 59 and 61 on the inner wall surface 58*a* and outer wall surface 58*b* of the annular wall housing groove 58 without clearance while the outer circumferential surface 38*b* of the shaft 38 and the inner circumferential surface 56*a* of the shaft passage hole 56 face each other with slight clearance, if an external force is applied to the housing 36, a large part of the external force is borne by the pressing abutment of the inner wall surface 40*a* and outer wall surface 40*b* of the annular wall 40 against the ribs 59 and 61 on the inner wall surface 58*a* and outer wall surface 58*b* of the annular wall housing groove 58 while the remaining part of the external force is borne by the pressing abutment between the outer circumferential surface 38*b* of the shaft 38 and the inner circumferential surface 56*a* of the shaft passage hole 56. This reduces the force applied to the shaft 38 and more reliably prevents the shaft 38 from being bent or broken.

According to the embodiment described above, since the annular wall 40 is hidden by being housed in the annular wall housing groove 58, the door mirror ensures appearance equivalent to that of conventional vehicle door mirrors. Also, since the mirror-rotating-member-side portion 54 and base-side portion 60 of the clutch are placed on the inner circumferential side of the annular wall 40 and annular wall housing groove 58, there is no need for a exclusive radial width (additional radial width provided, around the rotation axis S, on the housing support member 34 and base 32 in order to form the clutch) used for placing the clutch on the outer circumferential side of the annular wall 40 and annular wall housing groove 58. Also, the harness 62, which is passed through the hollow part 38*a* of the shaft 38, can be laid out easily. Besides, since the coil spring 46 is placed on the inner circumferential side of the annular wall housing groove 58, the coil spring 46 can be reduced in diameter.

Second Embodiment of Manually Retractable Door Mirror

Figure 14:
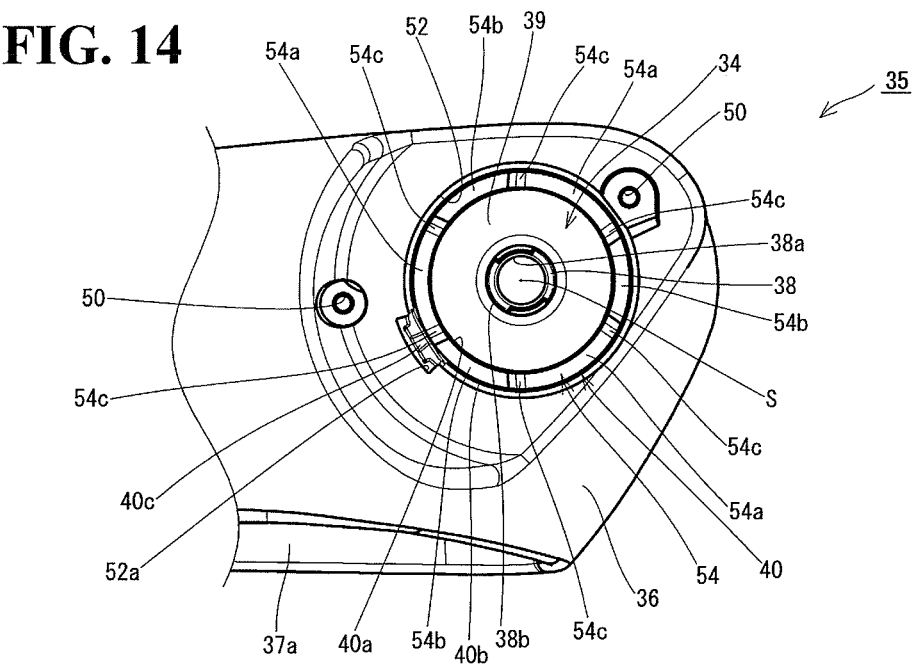
FIG. 14 is a diagram showing how the housing support member 34 is housed in the depression 42 in the housing 36 as viewed from the bottom side of the housing 36 of a manually retractable door mirror according to a second embodiment of the present invention.
Figure 15:
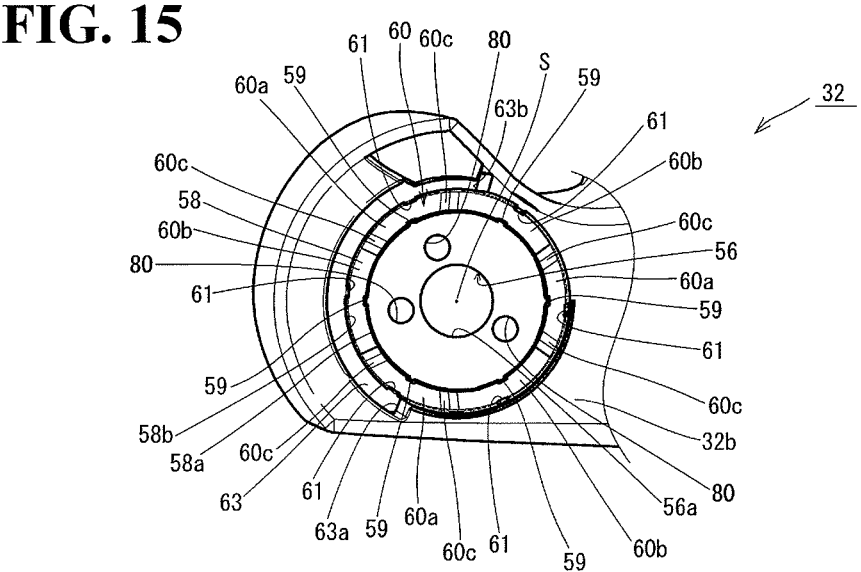
FIG. 15 is a plan view of the rotation support section 32b of the base 32 in the manually retractable door mirror according to the second embodiment of the present invention.
Figure 16:
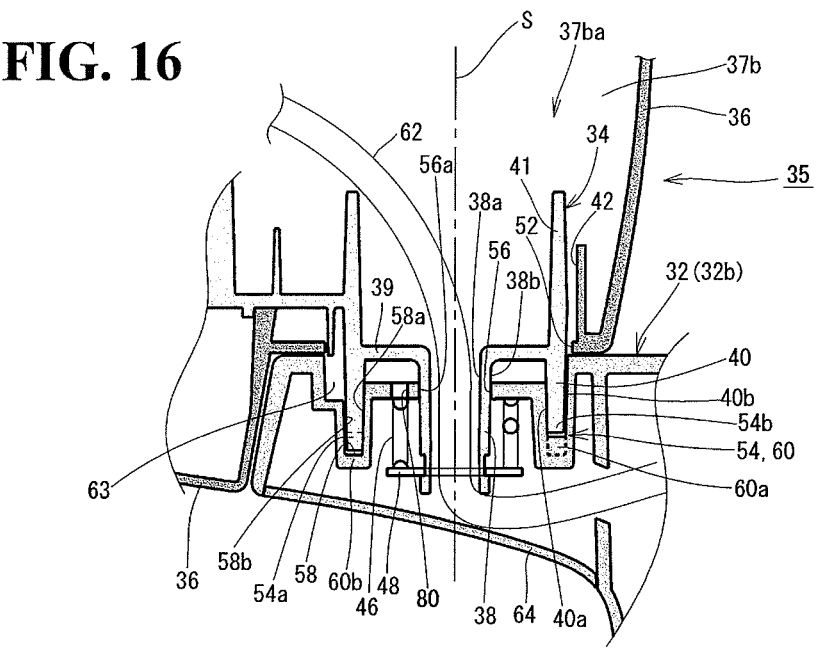
FIG. 16 is a partial sectional view of the manually retractable door mirror according to the second embodiment of the present invention cut along a plane passing through the rotation axis S when the housing 36 is at the return position.

A second embodiment of a manually retractable door mirror according to the present invention is shown in FIGS. 14 to 16. According to the present embodiment, the mirror-rotating-member-side portion 54 of the clutch is placed on top of the annular wall 40 and the base-side portion 60 of the clutch is formed in the bottom of the annular wall housing groove 58. The rest of the configuration is the same as the first embodiment. FIG. 14 is a diagram showing how the housing support member 34 is placed (FIG. 3) in the depression 42 (FIG. 2) in the housing 36 as viewed from the bottom side of the housing 36 (FIG. 14 corresponds to FIG. 4 according to the first embodiment). FIG. 15 is a plan view of the rotation support section 32b of the base 32 (FIG. 15 corresponds to FIG. 8 according to the first embodiment). FIG. 16 is a sectional view taken along a plane passing through the rotation axis S when the housing 36 is at the return position (FIG. 16 corresponds to FIG. 6 according to the first embodiment). The same components as those in the first embodiment are denoted by the same reference numerals as the corresponding components in the first embodiment. The present embodiment eliminates the need for a exclusive radial width used for placing the clutch, making it possible to reduce the diameter needed for the base 32 to rotate relative to the housing support member 34. The door mirror according to the present embodiment operates in a manner similar to the door mirror according to the first embodiment.

Third Embodiment of Manually Retractable Door Mirror

Figure 17:
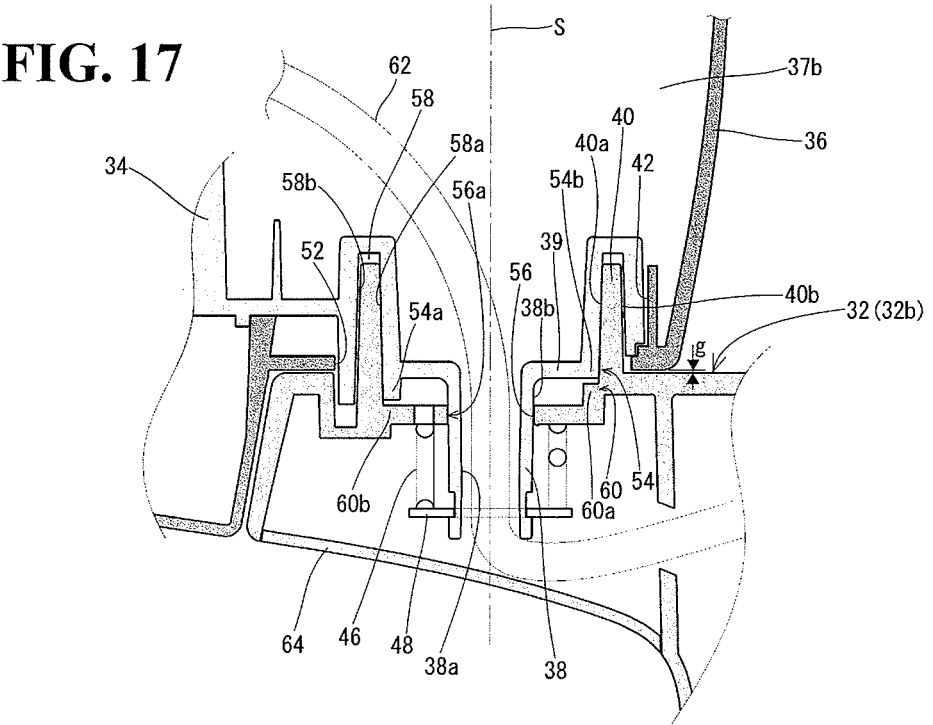
FIG. 17 is a partial sectional view of a third embodiment of a manually retractable door mirror according to the present invention cut along a plane passing through the rotation axis S when the housing 36 is at the return position.

A third embodiment of a manually retractable door mirror according to the present invention is shown in FIG. 17. Conversely to the first and second embodiments, the annular wall 40 is formed on the side of the base 32 and the annular wall housing groove 58 is formed on the side of the housing support member 34. The rest of the configuration is the same as the first and second embodiments. FIG. 17 is a sectional view taken along a plane passing through the rotation axis S when the housing 36 is at the return position (FIG. 17 corresponds to FIG. 6 according to the first embodiment and FIG. 16 according to the second embodiment). The same components as those in the first and second embodiments are denoted by the same reference numerals as the corresponding components in the first and second embodiments. The annular wall 40 circular in shape is formed on the base 32 coaxially with the rotation axis S, protruding upward. The annular wall housing groove 58 circular in shape is formed on the housing support member 34 coaxially with the rotation axis S, opening downward. The shaft passage hole 56 passes the shaft 38 with slight clearance when the housing 36 is at the return position. The plate thickness of the annular wall 40 decreases slightly toward the upper end. The groove width of the annular wall housing groove 58 decreases slightly toward the upper end to suit changes in the plate thickness of the annular wall 40. On the inner wall surface 58a and outer wall surface 58b of the annular wall housing groove 58, to define abutting positions with respect to the inner wall surface 40a and outer wall surface 40b of the annular wall 40, six ribs each (similar to the ribs 59 and 61 in FIG. 8) are formed in protrusion at equal circumferential angles, extending in a direction parallel to the rotation axis S. The annular wall housing groove 58 and annular wall 40 are designed such that the inner wall surface 58a (positions of the ribs) and inner wall surface 40a as well as the outer wall surface 58b (positions of the ribs) and outer wall surface 40b will abut each other without clearance when the housing 36 is at the return position. Just on the inner circumferential side of the annular wall 40 and annular wall housing groove 58, the base 32 has a ridge 60a and trough 60b of the clutch's base-side portion 60 while the housing support member 34 has a trough 54b and ridge 54a of the clutch's housing-support-member-side portion 54. At the return position, the ridge 60a and trough 60b of the clutch's base-side portion 60 come into mesh, respectively, with the trough 54b and ridge 54a of the clutch's housing-support-member-side portion 54 (state shown in FIG. 12). This state is maintained by the urging force of the coil spring 46. The door mirror according to the present embodiment operates in a manner similar to the door mirrors according to the first and second embodiments. Again, according to the present embodiment, the engagement between the annular wall 40 and annular wall housing groove 58 provides bearing capacity for the bending moment at a location outwardly away from the location of the shaft 38. Also, since the annular wall 40 is hidden by being housed in the annular wall housing groove 58, the door mirror ensures appearance equivalent to that of conventional vehicle door mirrors. Furthermore, the annular wall 40 serves as a shield against the air flow entering the gap g between opposing surfaces of the base 32 and housing 36 when the vehicle is running, and thereby prevents the air flow from entering the gap g and offers a wind noise reduction effect (a similar effect is obtained in the first and second embodiments as well).

Although in the first to third embodiments of the manually retractable door mirror, the plate 48 is used to restrain the coil spring 46 to the shaft 38, the plate 48 can be omitted if a plate-side end of the coil spring 46 is restrained directly to the shaft 38. Also, although the coil spring 46 is used in the first to third embodiments of the manually retractable door mirror, a disc spring or leaf spring may be used alternatively. Also, although in the first to third embodiments of the manually retractable door mirror, the annular wall 40 and annular wall housing groove 58 are placed coaxially with the shaft 38, the present invention is also applicable when a mirror rotating member 35 is rotatably supported on the base 32 using the shaft 38 alone without the annular wall 40 and annular wall housing groove 58.

First Embodiment of Electrically Retractable Door Mirror

Figure 18:
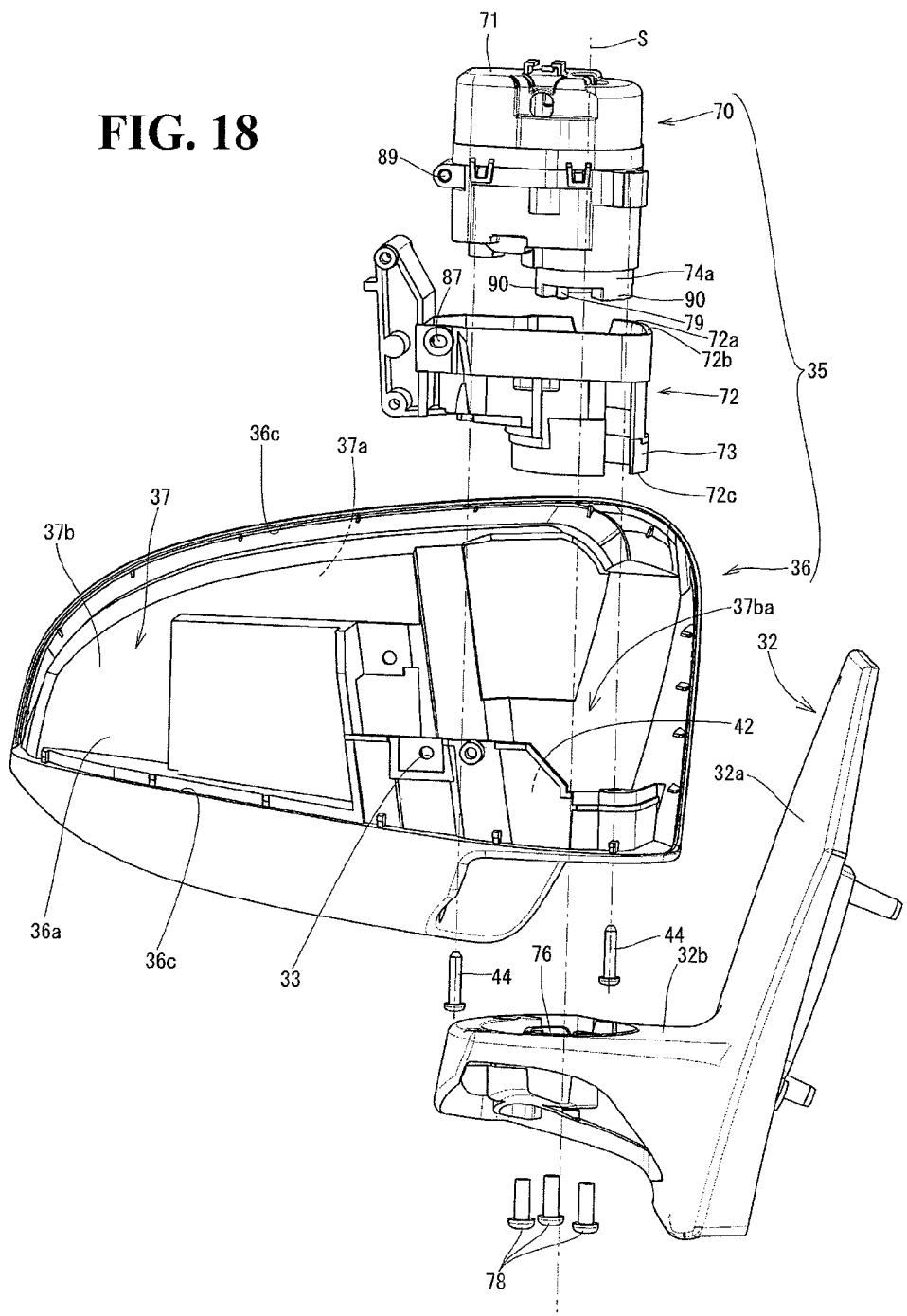
FIG. 18 is an exploded perspective view showing principal part of an first embodiment of an electrically retractable door mirror according to the present invention configured using the common base for manually retractable and electrically retractable door mirrors used in the first embodiment of the manually retractable door mirror.
Figure 22:
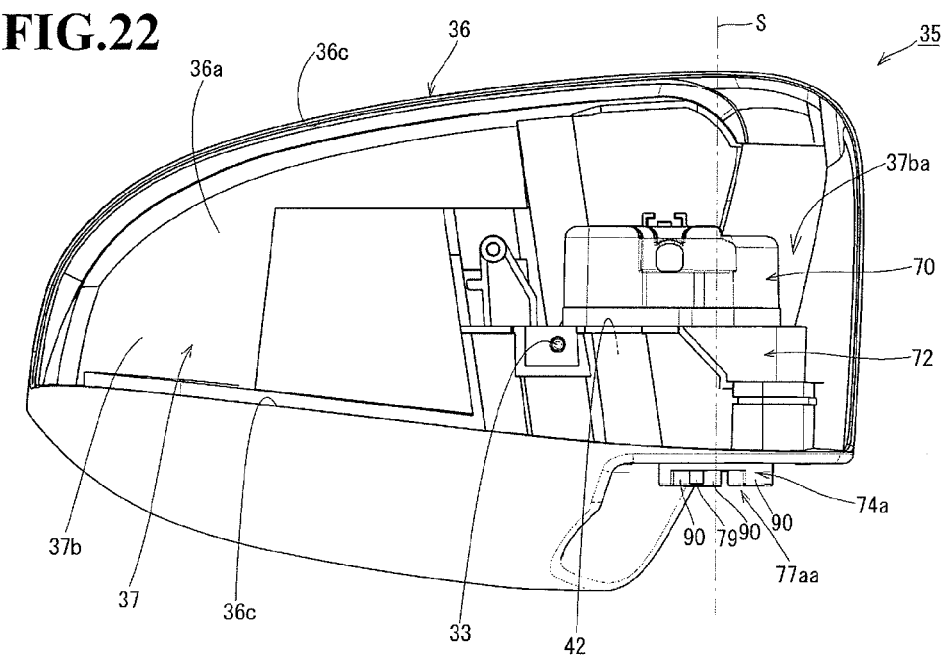
FIG. 22 is a rear view of the assembled components shown in FIG. 20.
Figure 23:
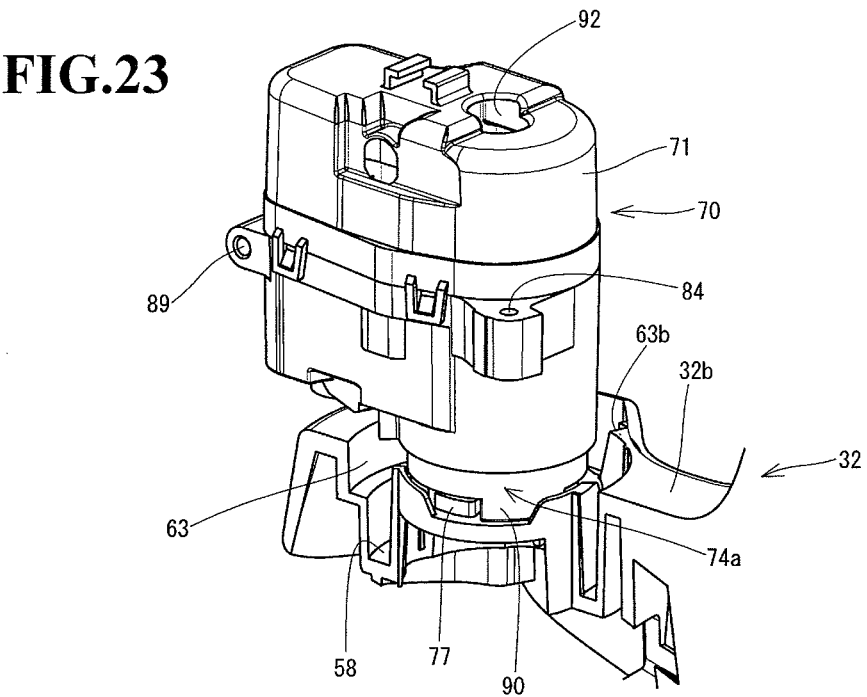
FIG. 23 is a perspective view showing how the electric drive mechanism 70 is placed and supported on the rotation support section 32*b* of the base 32 shown in FIG. 18.
Figure 24:
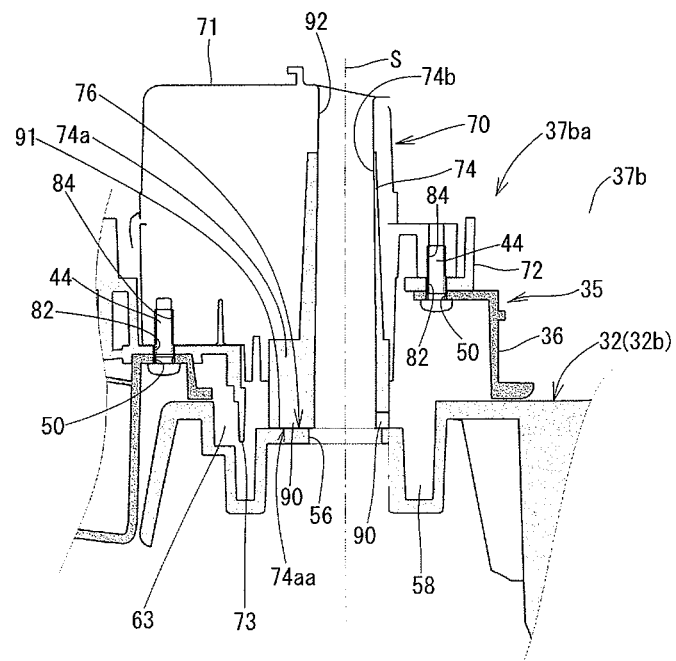
FIG. 24 is a partial sectional view (which corresponds to a cross section taken along line D-D in FIG. 21) taken at the position where the housing 36, fitting 72, and electric drive mechanism 70 of the electrically retractable door mirror in FIG. 18 are fixedly coupled.
Figure 25:
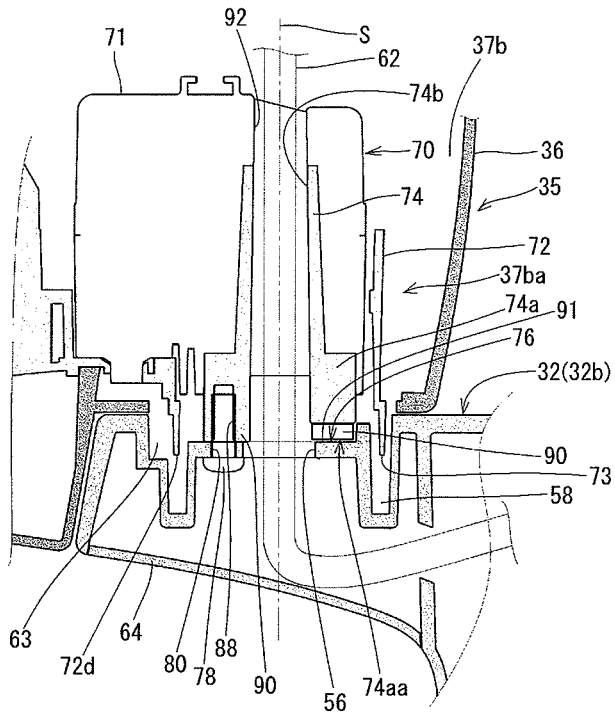
FIG. 25 is a partial sectional view (which corresponds to a cross section taken along line C-C in FIGS. 8 and 21) taken at the position where a shaft 74 of the electric drive mechanism 70 is fastened upright on the base 32 in the electrically retractable door mirror in FIG. 18.

An First embodiment of an electrically retractable door mirror according to the present invention is shown in FIGS. 18 to 25, where the embodiment is configured using the common base 32 for manually retractable and electrically retractable door mirrors described in the first embodiment of the manually retractable door mirror. The same components as those in the first embodiment of the manually retractable door mirror are denoted by the same reference numerals as the corresponding components in the first embodiment of the manually retractable door mirror. FIG. 18 is an exploded view showing a configuration of the electrically retractable door mirror according to the present embodiment. FIG. 18 shows a right door mirror as viewed from the rear. A housing cover mounted on the rear side of the housing 36, a mirror angle adjustment actuator, a mirror plate, and the like are not shown in FIG. 18. The door mirror includes the base 32 attached to the outer side of a car body, an electric drive mechanism 70, a fitting 72, and the housing 36. The fitting 72 is interposed between the electric drive mechanism 70 and housing 36 to fixedly couple the electric drive mechanism 70 to housing 36. The fitting 72 is a one-piece molding of rigid plastics such as PA+GF resin or a one-piece casting of metal such as aluminum. The fitting 72 includes an inner space 72a used to house the electric drive mechanism 70 fitted through an upper opening 72b. An opening 72c is formed in an undersurface of the fitting 72 to downwardly expose an undersurface 74aa of a shaft 74 (FIGS. 24 and 25). The fitting 72 includes an annular wall 73 protruding downward. The annular wall 73 is housed in the annular wall housing groove 58 of the base 32 without contact (FIGS. 24 and 25). As shown in FIG. 19, in some circumferential area on an outer circumferential surface of the annular wall 73, a stopper 73a is formed, protruding radially outward. As in the case of the manually retractable door mirror, being placed in a stopper traveling groove 63 formed in some circumferential area around the rotation axis S at a location on the outer circumferential side of the annular wall housing groove 58 of the base 32 in FIG. 8, the stopper 73a moves along the stopper traveling groove 63 as the fitting 72 rotates and is restrained by abutting against opposite ends 63a and 63b of the stopper traveling groove 63. The stopper 73a is restrained by the end 63a at the forward folded position of the housing 36 and restrained by the end 63b at the retracted position (backward folded position) of the housing 36. Since the stopper 73a is formed on the outer circumferential surface of the annular wall 73, the stopper 73a can be supported more firmly than when the stopper 73a is coupled to the fitting 72 by its base alone without the annular wall 73. This prevents the stopper 73a from being broken. Conversely, the stopper traveling groove 63 may be formed at a location just on the inner circumferential side of the annular wall housing groove 58 and the stopper 73a may be formed on an inner circumferential surface of the annular wall 73, protruding therefrom. As shown in FIG. 19, on the front side the fitting 72, screw holes 67 and 69 (which correspond to the screw holes 29 and 31 of the housing support member 34 in FIG. 7) are formed to screw and support part of the mirror angle adjustment actuator. Referring to FIG. 18, the electric drive mechanism 70 is housed and held in the inner space 72a of the fitting 72, housed and held in the depression 42 in the housing 36 together with the fitting 72, placed in an electric drive mechanism placement space 37ba (in common with the housing support member placement space of the manually retractable door mirror), and fixedly supported by the housing 36 together with the fitting 72 using screws 44. In this way, the mirror rotating member 35 is constructed by integrating the electric drive mechanism 70 housed in the fitting 72 with the housing 36. The base 32, housing 36, and housing cover are the same as those described in the first embodiment of the manually retractable door mirror.

Figure 21:
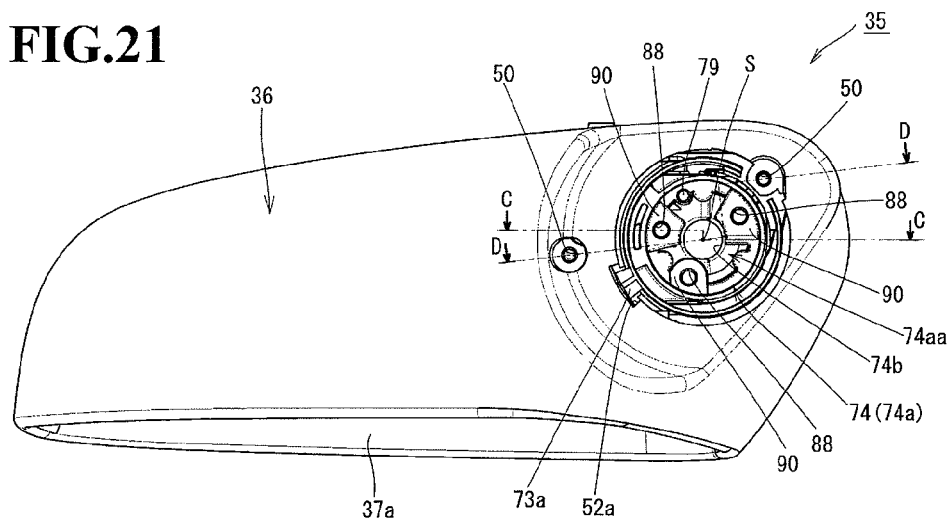
FIG. 21 is a bottom view of the assembled components shown in FIG. 20.

The electric drive mechanism 70 has a configuration similar to that of an electric drive mechanism of conventional electrically retractable door mirrors and includes a hollow round metal bar shaft 74 (FIGS. 24 and 25), motor, gear, clutch mechanism, coil spring, electronic circuit board, and the like housed and placed in a casing 71. The shaft 74 is placed coaxially with the rotation axis S. The undersurface 74aa of a basal part 74a of the shaft 74 is exposed through the undersurface of the housing 36. As shown in FIG. 21, in lower part of the basal part 74a of the shaft 74, legs 90 is formed in protrusion at three locations around the rotation axis S. Screw holes 88 are formed in an undersurface of each leg 90. Also, a positioning pin 79 is formed in protrusion in the lower part of the basal part 74a of the shaft 74 as shown in FIG. 21. A hollow part 74b is formed in the center of the shaft 74, piercing the length of the shaft 74. A lower end of the hollow part 74b opens up in a central part of the undersurface 74aa of a basal part 74a. An upper end of the hollow part 74b opens above the electric drive mechanism 70 by communicating with a hollow part 92 (FIGS. 24 and 25) formed in an upper part of the casing 71 of the electric drive mechanism 70.

An upright shaft fastening surface 76 (FIGS. 8 and 9) is provided in a central part of an upper surface of the base 32. As shown in FIGS. 8 and 9, on the upright shaft fastening surface 76, walls 77 and a boss 75 are formed in protrusion. That area of the upright shaft fastening surface 76 which is free from the walls 77 and boss 75 provides a leg supporting surface 91 which supports the legs 90. Screw through-holes 80 are formed in the leg supporting surface 91. A pin-receiving hole 81 is formed in the boss 75. The shaft 74 is supported on the upright shaft fastening surface 76 with the legs 90 placed on the leg supporting surface 91. In this state, the walls 77 and boss 75 are fitted in spaces among the legs 90 and the pin 79 is received in the pin-receiving hole 81. As a result of the engagement (fit) between concavo-convexities on the upright shaft fastening surface 76 and concavo-convexities on the undersurface 74aa of the shaft 74, the shaft 74 is positioned on the base 32 with its center axis aligned with the rotation axis S. In a state where the shaft 74 is positioned on the base 32, three screws 78 (FIG. 18) are passed through the screw through-holes 80 from the underside of the base 32 and screwed into the screw holes 88 formed in the undersurfaces of the legs 90. Consequently, the shaft 74 is fastened upright on the base 32 (FIG. 25). When the shaft 74 is fastened upright on the base 32, the center hole 56 (shaft passage hole in the case of the manually retractable door mirror) of the base 32, the hollow part 74b of the shaft 74, and the hollow part 92 of the casing 71 are communicated with each other to form a harness passage hole.

The electrically retractable door mirror in FIG. 18 is assembled, for example, as follows.

Figure 26:
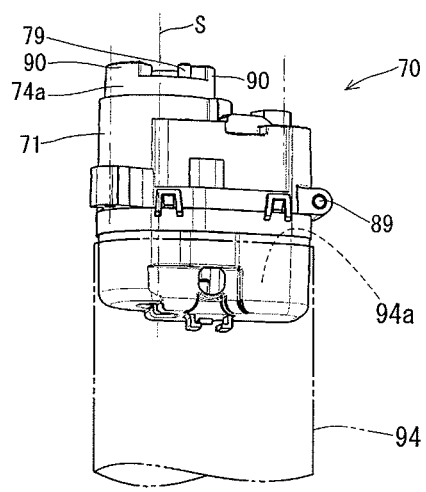
FIG. 26 is a perspective view showing how the electric drive mechanism 70 is received and supported from below in an upside-down position by a jig 94 during assembly of the electrically retractable door mirror in FIG. 18 using the assembly method according to the present invention.

(1) As shown in FIG. 26, a jig 94 which supports the electric drive mechanism 70 is fastened upright on a foundation (not shown) such as a workbench. Then, the electric drive mechanism 70 is supported in an upside-down position with the upper part of the electric drive mechanism 70 put in a depression 94a in the top of the jig 94 (where the upper part is the part placed on the lower side in an upside-down position). In the example of FIG. 26, the jig 94 is a rod-like member or tubular member which has the depression 94a in the top. The jig 94 is fastened upright on the foundation and the upper part of the electric drive mechanism 70 is detachably housed without wobble in the depression 94a in the jig 94 (where the upper part is the part placed on the lower side in the upside-down position), and consequently the electric drive mechanism 70 is held by the jig 94.

(2) With the electric drive mechanism 70 turned upside down, the components in FIG. 18 are assembled one after another in an upside-down position onto the electric drive mechanism 70 from above. Specifically, first the fitting 72 is turned upside down and brought close to the electric drive mechanism 70 from above, and the lower part of the electric drive mechanism 70 is fitted and housed in the inner space 72a of the fitting 72 (where the lower part is the part placed on the upper side in the upside-down position). Consequently, with an approximately lower half (approximately upper half in the upside-down position) of the electric drive mechanism 70 fitted in the inner space 72a, the fitting 72 is mounted on the electric drive mechanism 70. In the meantime, the undersurface 74aa of the basal part 74a of the shaft 74 of the electric drive mechanism 70 is exposed upward through the lower opening 72c of the fitting 72. Since the jig 94 supports only the upper part of the electric drive mechanism 70 (where the upper part is the part placed on the lower side in the upside-down position), the jig 94 and fitting 72 do not interfere (collide) with each other.

Figure 20:
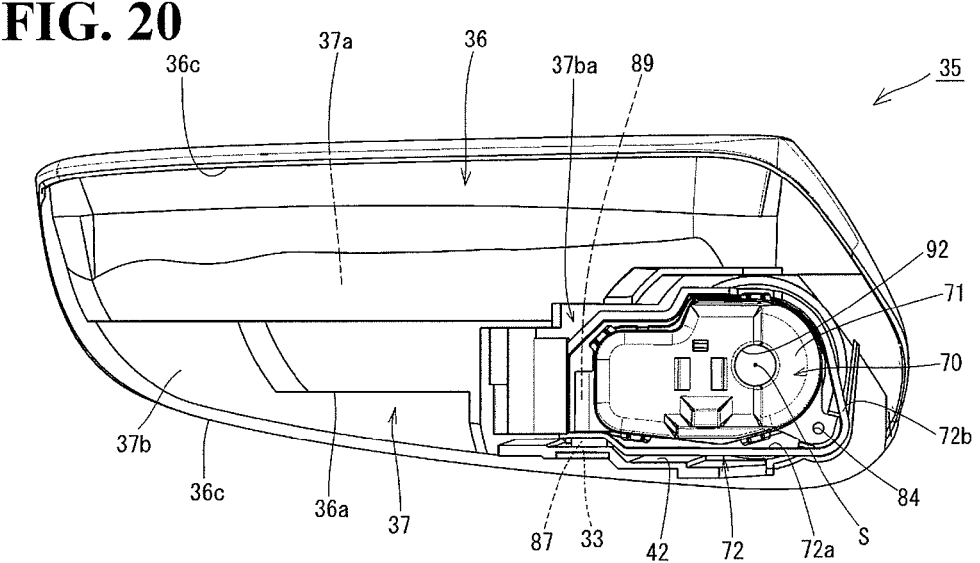
FIG. 20 is a diagram showing how an electric drive mechanism 70 is housed in the depression 42 in the housing 36 via the fitting 72 and placed in an electric drive mechanism placement space 37ba in the electrically retractable door mirror in FIG. 18.

(3) The housing 36 turned upside down is brought, from above, close to the electric drive mechanism 70 on which the fitting 72 is mounted, the electric drive mechanism 70 on which the fitting 72 is mounted is housed in the depression 42, and the electric drive mechanism 70 is placed in the electric drive mechanism placement space 37ba together with the fitting 72. Resulting state of the components is shown in FIGS. 20, 21 and 22 (in an upside-down position, however). During this time, the jig 94 and fitting 72 do not interfere (collide) with each other.

(4) Screws 44 (FIG. 18) are inserted, from above, through two screw through-holes 50 (FIG. 21) formed in the housing 36 and are screwed into screw holes in the electric drive mechanism 70 to fixedly couple the housing 36 and electric drive mechanism 70 to each other. FIG. 24 shows a cross section (which corresponds to a cross section taken along line D-D in FIG. 21) taken at the position where the electric drive mechanism 70 and housing 36 are fixedly coupled (in an upside-down position, however). As shown in FIG. 24, the electric drive mechanism 70 and housing 36 are fixedly coupled to each other as the screws 44 are inserted through the screw through-holes 50 formed in the housing 36 and screwed into screw holes 84 formed in the undersurface of the casing 71 of the electric drive mechanism 70 via through-holes 82 formed in the fitting 72.

(5) The base 32 is turned upside down and brought close to the housing 36 from above. Then, with the center axis of the shaft 74 aligned with the rotation axis S, the upright shaft fastening surface 76 of the base 32 is mounted on the basal part 74a of the shaft 74 exposed through the round hole 52 in the housing 36. FIG. 23 shows, with the fitting 72 and housing 36 removed, how the electric drive mechanism 70 is mounted on the rotation support section 32b of the base 32 (in an upside-down position, however). As a result of the engagement between the legs 90 and walls 77 as well as engagement between the pin 79 (FIG. 21) and pin-receiving hole 81 (FIGS. 8 and 9), the basal part 74a of the shaft 74 is positioned on the upright shaft fastening surface 76 of the base 32.

(6) From the reverse side of the rotation support section 32b of the base 32, the screws 78 (FIG. 18) are inserted into the screw through-holes 80 (FIG. 8) from above and screwed into the screw holes 88 (FIG. 21) formed in the undersurface 74aa of the shaft 74. Consequently, the shaft 74 is fastened upright on the rotation support section 32b, and the mirror rotating member 35 and base 32 are coupled to each other in such a way as to be able to rotate around the rotation axis S. FIGS. 24 and 25 are sectional views showing resulting state (in an upside-down position, however).

(7) A screw (not shown) is inserted into the screw through-hole 33 (FIG. 18) in the rear side of the housing 36, passed through a screw through-hole 87 (FIG. 18) in the fitting 72, and screwed into a screw hole 89 (FIG. 18) in the electric drive mechanism 70, thereby reinforcing the coupling among the housing 36, fitting 72, and electric drive mechanism 70.

(8) The structure assembled as described above is removed from the jig 94 and the housing cover is attached to an opening (a region surrounded by edges 36c shown in FIGS. 18, 20 and 22) in the rear side of the housing 36. Consequently, the electric drive mechanism 70 excluding the basal part 74a of the shaft 74 protruding from the undersurface of the housing 36 has been housed in the inner space 37 of the housing 36.

(9) The mirror angle adjustment actuator is mounted in the front space 37a of the housing 36, and then the mirror plate is mounted on the mirror angle adjustment actuator.

Since the components can be assembled from above under the state where the electric drive mechanism 70 is supported by the jig 94 in Steps (1) to (6), the steps described above enable ease of assembly and make it easy to automate assembly.

FIG. 25 is a sectional view taken at the position corresponding to line C-C in FIGS. 8 and 21 when the housing 36 is at the return position after the door mirror in FIG. 18 is assembled. The harness 62 used to supply electric drive power to the electric drive mechanism 70, mirror angle adjustment actuator, and the like is passed through the hollow part 74b of the shaft 74 and the hollow part 92 of the casing 71 communicated with each other. A lower opening of the base 32 is closed by a lid 64. When a motor in the electric drive mechanism 70 is operated, the casing 71 of the electric drive mechanism 70 rotates on the shaft 74 fastened upright on the rotation support section 32b of the base 32, causing the housing 36 coupled to the casing 71 to rotate around the rotation axis S within an angular range permitted by the stopper 73a (FIG. 19) and thereby move from the return position to the retracted position or from the retracted position to the return position. If an external force acts on the housing 36 in the forward direction of the vehicle when the housing 36 is at the return position, since the clutch is disengaged in the electric drive mechanism 70 by overcoming the urging force of the coil spring, the housing 36 moves to the forward tilted position (forward folded position) and thereby releases the external force.

In the example described above, the electrically retractable door mirror according to the present invention is configured using the common base for manually retractable and electrically retractable door mirrors described in the first embodiment of the manually retractable door mirror, but the electrically retractable door mirror according to the present invention can also be configured using the common base for manually retractable and electrically retractable door mirrors described in the second embodiment of the manually retractable door mirror.

Second Embodiment of Electrically Retractable Door Mirror

Figure 27:
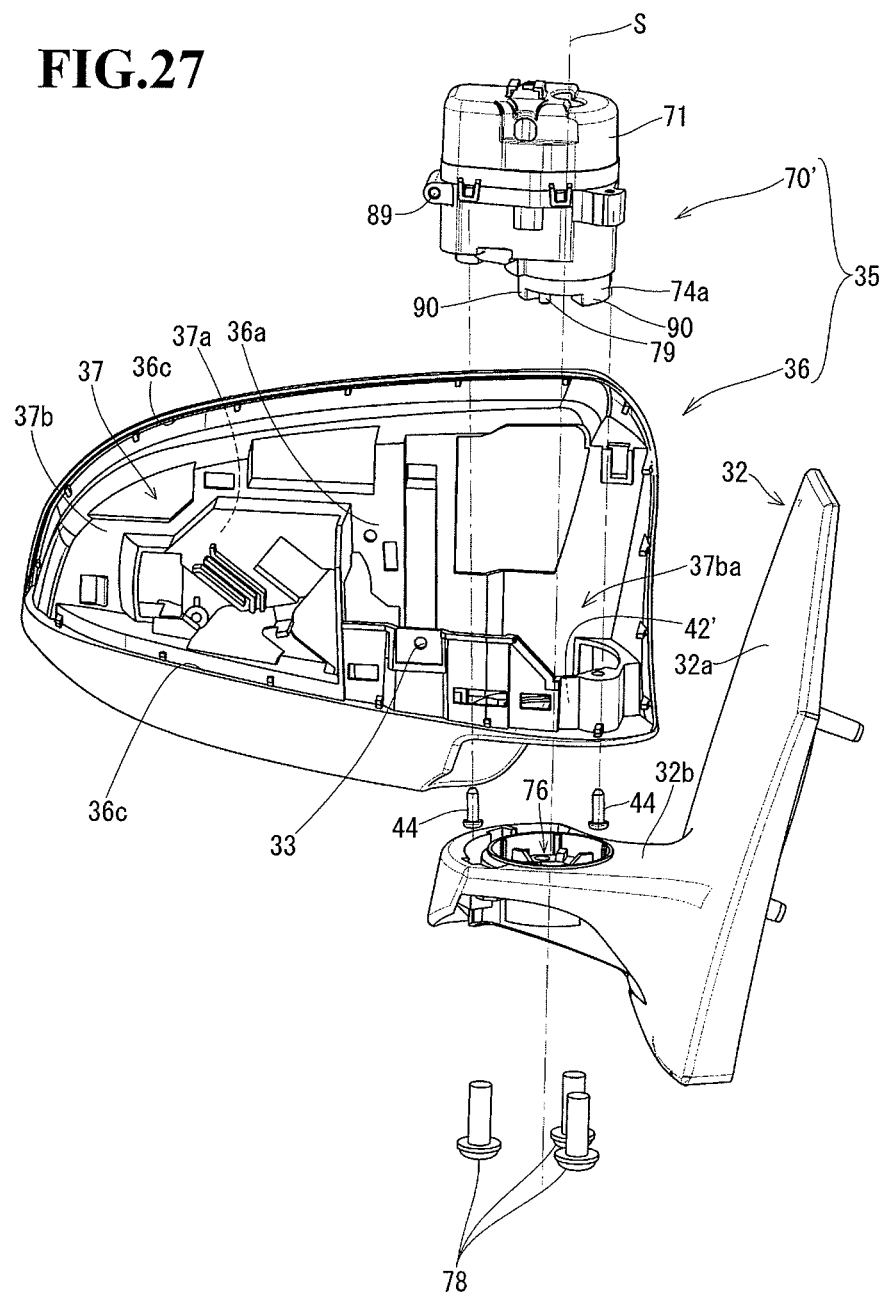
FIG. 27 is an exploded perspective view showing principal part of a second embodiment of the electrically retractable door mirror according to the present invention configured using a common base for manually retractable and electrically retractable door mirrors also used in the first embodiment of the manually retractable door mirror.

In the electrically retractable door mirror in FIG. 18, if external shape of the electric drive mechanism 70 and internal shape of the depression 42 are designed such that the electric drive mechanism 70 will be housed and held directly in the depression 42 of the housing 36, the need for the fitting 72 can be eliminated. An embodiment thus configured is shown in FIG. 27. The same components as those in FIG. 18 are denoted by the same reference numerals as the corresponding components in FIG. 18. In FIG. 27, external shape of an electric drive mechanism 70' and internal shape of a depression 42' are formed three-dimensionally such that the electric drive mechanism 70' will be housed and held directly in the depression 42' of the housing 36. This eliminates the need for the fitting 72 shown in FIG. 18. A part corresponding to the stopper 73a in FIG. 19 is formed on an outer circumferential surface of the electric drive mechanism 70'. Screw holes corresponding to the screw holes 67 and 68 (FIG. 19) formed in the front face of the fitting 72 to screw part of the mirror angle adjustment actuator are formed in the front face of the partition plate 36a of the housing 36, and the entire mirror angle adjustment actuator is supported by the partition plate 36a of the housing 36. The screws 44 are inserted through the screw through-holes 50 (FIG. 24) in the undersurface of the housing 36 and screwed directly into screw holes 84 in the electric drive mechanism 70' without an intervening fitting, to fixedly couple the electric drive mechanism 70' and housing 36 to each other. Also, on the rear side of the housing 36, a screw (not shown) is inserted through the screw through-hole 33 and screwed into the screw hole 89 in the electric drive mechanism 70' without an intervening fitting, thereby reinforcing the coupling among the housing 36 and electric drive mechanism 70'. The rest of the configuration is the same as the electrically retractable door mirror in FIG. 18. The electrically retractable door mirror in FIG. 27 can be assembled using steps in which components are assembled upside down as described in the first embodiment of the electrically retractable door mirror (however, there is no need to assemble the fitting 72 onto the electric drive mechanism 70').

Incidentally, although in the embodiments described above, a depression is formed in the housing support member placement space or electric drive mechanism placement space, it is not essential to form a depression as long as there is a space in which the housing support member or electric drive mechanism can be inserted from above (or from below when assembled upside down) and placed.

What is claimed is:

1. A manually retractable vehicle door mirror comprising:
    a housing support member provided with a shaft formed protruding downward and a screw hole that opens downward, the screw hole being positioned around the shaft;
    a housing provided with a housing support member placement space in which the housing support member can be placed by being inserted from above, a lower opening which allows the shaft to be exposed downward with the housing support member placed in the housing support member placement space, and a housing support member fastening screw through-hole formed around the lower opening;
    a housing support member fastening screw which fastens the housing support member to the housing by being passed through the housing support member fastening screw through-hole from an underside of the housing and screwed into the screw hole, that opens downward, in the housing support member;
    a base provided with a shaft passage hole into which the shaft is rotatably inserted, where the base is intended to be attached to an outer side of a car body and the shaft is exposed through the lower opening of the housing; and
    a spring member fitted, in a compressed state, over the shaft protruding from the shaft passage hole on the reverse side of the base.

2. The manually retractable vehicle door mirror according to claim 1, wherein the housing support member placement space has a depression which, being open upward, houses and supports at least a lower part of the housing support member.

3. The manually retractable vehicle door mirror according to claim 2, wherein the housing support member includes an annular wall formed coaxially with the shaft by protruding downward at a location outwardly away from the shaft and the base includes an annular wall housing groove which is open upward to rotatably house the annular wall of the housing support member; or the base includes an annular wall formed coaxially with the shaft by protruding upward at a location outwardly away from the shaft and the housing support member includes an annular wall housing groove which is open downward to rotatably house the annular wall of the base.

4. An assembly method for the manually retractable vehicle door mirror according to claim 3, comprising:
    supporting the housing support member by receiving the housing support member in an upside-down position from below by a jig;
    putting, from above, the housing in an upside-down position on the housing support member supported by the jig and placing the housing support member in the housing support member placement space;
    coupling the housing and the housing support member to each other by passing the housing support member fastening screw through the housing support member fastening screw through-hole in the housing from above and screwing the housing support member fastening screw into the screw hole, that opens downward, in the housing support member;
    inserting the shaft into the shaft passage hole with the base being in an upside-down position, the shaft protruding upward from the lower opening of the housing; and
    fitting the spring member, in a compressed state, over the shaft protruding from the shaft passage hole.

5. An assembly method for the manually retractable vehicle door mirror according to claim 2, comprising:
    supporting the housing support member by receiving the housing support member in an upside-down position from below by a jig;
    putting, from above, the housing in an upside-down position on the housing support member supported by the jig and placing the housing support member in the housing support member placement space;
    coupling the housing and the housing support member to each other by passing the housing support member fastening screw through the housing support member fastening screw through-hole in the housing from above and screwing the housing support member fastening screw into the screw hole, that opens downward, in the housing support member;
    inserting the shaft into the shaft passage hole with the base being in an upside-down position, the shaft protruding upward from the lower opening of the housing; and
    fitting the spring member, in a compressed state, over the shaft protruding from the shaft passage hole.

6. The manually retractable vehicle door mirror according to claim 1, wherein the housing support member includes an annular wall formed coaxially with the shaft by protruding downward at a location outwardly away from the shaft and the base includes an annular wall housing groove which is open upward to rotatably house the annular wall of the housing support member; or the base includes an annular wall formed coaxially with the shaft by protruding upward at a location outwardly away from the shaft and the housing support member includes an annular wall housing groove which is open downward to rotatably house the annular wall of the base.

7. An assembly method for the manually retractable vehicle door mirror according to claim 6, comprising:
    supporting the housing support member by receiving the housing support member in an upside-down position from below by a jig;
    putting, from above, the housing in an upside-down position on the housing support member supported by the jig and placing the housing support member in the housing support member placement space;
    coupling the housing and the housing support member to each other by passing the housing support member fastening screw through the housing support member fastening screw through-hole in the housing from above and screwing the housing support member fastening screw into the screw hole, that opens downward, in the housing support member;
    inserting the shaft into the shaft passage hole with the base being in an upside-down position, the shaft protruding upward from the lower opening of the housing; and fitting the spring member, in a compressed state, over the shaft protruding from the shaft passage hole.

8. An assembly method for the manually retractable vehicle door mirror according to claim 1, comprising:
- supporting the housing support member by receiving the housing support member in an upside-down position from below by a jig;
- putting, from above, the housing in an upside-down position on the housing support member supported by the jig and placing the housing support member in the housing support member placement space;
- coupling the housing and the housing support member to each other by passing the housing support member fastening screw through the housing support member fastening screw through-hole in the housing from above and screwing the housing support member fastening screw into the screw hole, that opens downward, in the housing support member;
- inserting the shaft into the shaft passage hole with the base being in an upside-down position, the shaft protruding upward from the lower opening of the housing; and
- fitting the spring member, in a compressed state, over the shaft protruding from the shaft passage hole.

* * * * *